(12) United States Patent
Brown et al.

(10) Patent No.: US 10,521,208 B2
(45) Date of Patent: Dec. 31, 2019

(54) DIFFERENTIATED STATIC ANALYSIS FOR DYNAMIC CODE OPTIMIZATION

(71) Applicant: MICROSOFT TECHNOLOGY LICENSING, LLC., Redmond, WA (US)

(72) Inventors: Morgan Asher Brown, Redmond, WA (US); David Charles Wrighton, Redmond, WA (US); Mei-Chin Tsai, Bellevue, WA (US); Shah Mohammad Faizur Rahman, Kirkland, WA (US); Yi Zhang, Sammamish, WA (US); Ian M. Bearman, Seattle, WA (US); Erdembilegt Janchivdorj, Bellevue, WA (US); David Adam Hartglass, Bellevue, WA (US); David Mitford Gillies, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

(21) Appl. No.: 15/632,286

(22) Filed: Jun. 23, 2017

(65) Prior Publication Data

US 2018/0373515 A1    Dec. 27, 2018

(51) Int. Cl.
*G06F 8/41* (2018.01)
*G06F 9/455* (2018.01)

(52) U.S. Cl.
CPC .......... *G06F 8/4441* (2013.01); *G06F 8/4434* (2013.01); *G06F 8/4443* (2013.01); *G06F 8/433* (2013.01); *G06F 8/447* (2013.01); *G06F 9/4552* (2013.01)

(58) Field of Classification Search
CPC ...... G06F 8/433; G06F 8/4441; G06F 8/4443; G06F 8/4434; G06F 9/4552
USPC .................................................. 717/136–161
See application file for complete search history.

(56) References Cited

U.S. PATENT DOCUMENTS

| 5,950,009 A * | 9/1999 | Bortnikov ............... G06F 8/445 712/214 |
| 6,289,506 B1 | 9/2001 | Kwong et al. |
| 6,412,107 B1 | 6/2002 | Cyran et al. |
| 6,865,734 B2 | 3/2005 | Holzle et al. |

(Continued)

OTHER PUBLICATIONS

Wang et al. "A Method-Based Ahead-of-Time Compiler for Android Applications", Oct. 9-14, 2011, total pages 10, retrieved from <http://www.cs.nthu.edu.tw/~ychung/conference/CASES2011.pdf> (Year: 2011).*

(Continued)

*Primary Examiner* — Marina Lee

(57) ABSTRACT

A mechanism for generating optimized native code for a program having dynamic behavior uses a static analysis of the program to predict the likelihood that different elements of the program are likely to be used when the program executes. The static analysis is performed prior to execution of the program and marks certain elements of the program with confidence indicators that classify the elements with either a high level of confidence or a low level of confidence. The confidence indicators are then used by an ahead-of-time native compiler to generate native code and to optimize the code for faster execution and/or a smaller-sized native code.

19 Claims, 5 Drawing Sheets

(56) References Cited

U.S. PATENT DOCUMENTS

| | | | | |
|---|---|---|---|---|
| 7,308,684 B2* | 12/2007 | Chan | G06F 8/70 | 717/159 |
| 8,473,935 B2* | 6/2013 | Grice | G06F 8/4441 | 717/140 |
| 8,578,348 B2* | 11/2013 | Fliess | G06F 8/70 | 717/135 |
| 8,959,646 B2* | 2/2015 | Brucker | G06F 21/577 | 726/25 |
| 8,966,453 B1* | 2/2015 | Zamfir | G06F 11/3604 | 714/38.1 |
| 9,195,486 B2 | 11/2015 | Porras et al. | | |
| 9,292,419 B1* | 3/2016 | Kintali | G06F 11/3676 | |
| 9,417,857 B2 | 8/2016 | Chati et al. | | |
| 9,459,852 B2* | 10/2016 | Inada | G06F 9/3844 | |
| 2004/0015929 A1 | 1/2004 | Lewis | G06F 8/314 | 717/156 |
| 2006/0048114 A1* | 3/2006 | Schmidt | G06F 9/45516 | 717/148 |
| 2009/0044177 A1* | 2/2009 | Bates | G06F 8/75 | 717/131 |
| 2010/0299658 A1* | 11/2010 | Ng | G06F 8/443 | 717/140 |
| 2014/0189330 A1* | 7/2014 | Zaks | G06F 8/4441 | 712/239 |
| 2014/0380289 A1* | 12/2014 | Kalogeropulos | G06F 8/443 | 717/152 |
| 2014/0380486 A1* | 12/2014 | Brucker | G06F 21/577 | 726/25 |
| 2015/0128115 A1* | 5/2015 | Chafi | G06F 8/443 | 717/148 |
| 2016/0004518 A1* | 1/2016 | Sharma | G06F 8/443 | 717/157 |
| 2016/0085528 A1 | 3/2016 | Kalogeropulos et al. | | |
| 2018/0373515 A1* | 12/2018 | Brown | G06F 8/4434 | |

OTHER PUBLICATIONS

"Implementing ART Just-In-Time (JIT) Compiler", https://source.android.com/devices/tech/dalvik/jit-compiler, Retrieved on: Apr. 25, 2017, 10 pages.

"ART and Dalvik", https://source.android.com/devices/tech/dalvik/jit-compiler, Retrieved on: Apr. 25, 2017, 4 pages.

Lim, et al., "A Selective Ahead-Of-Time Compiler on Android Device",In Proceedings of International Conferences on Information Science and Applications, May 23, 2012, 6 pages.

"Runtime Directives (rd.xml) Configuration File Reference", https://msdn.microsoft.com/en-us/library/dn600639(v=vs.110).aspx, Retrieved on: Apr. 28, 2017, 10 pages.

"History for CLRProfiler/CLRProfiler.doc-MicrosoftArchive/clrprofiler.GitHub", Retrieved from: https://github.com/MicrosoftArchive/clrprofiler/commits/master/CLRProfiler.doc, Apr. 27, 2017, 1 Page.

"International Search Report and Written Opinion Issued in PCT Application No. PCT/US2018/034989", dated Oct. 8, 2018, 24 Pages.

Sollich, Peter, "CLR Profiler", Retrieved from: https://github.com/MicrosoftArchive/clrprofiler/raw/master/CLRProfiler/CLRProfiler.doc, Apr. 27, 2017, 108 Pages.

Wang, et al., "A method-based ahead-of-time compiler for android applications", In Proceedings of the 14th ACM International Conference on Compilers, architectures and synthesis for embedded systems, Oct. 9, 2011, 10 Pages.

* cited by examiner

DIFFERENTIATED STATIC ANALYSIS FOR DYNAMIC CODE OPTIMIZATION

BACKGROUND

A compiler is a program that translates source code written in a high-level programming language into a lower-level language, such as intermediate level code (e.g., bytecode, Common Language Infrastructure (CIL), etc.) and/or machine code (i.e., native code, object code). An Ahead-of-Time (AOT) compiler translates the source code of a program into machine code before the program executes. The AOT compiler performs static analyses on the program that are beneficial for catching errors before the program executes and to perform optimizations aimed at reducing the execution speed of the program.

A Just-In-Time (JIT) compiler translates the intermediate level code into machine code at runtime. During program execution, a language virtual machine translates the intermediate level code into machine code instructions. JIT compilation is used to support dynamic features of a programming language, such as reflection, run time type checking, and late binding, that rely on the current program state. The dynamic features provide greater flexibility by enabling extensions to the program and modifications to the type system at runtime but at the expense of bearing an increased execution time of the program.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subject matter described herein pertains to techniques, systems, processes, and devices that support the generation of native code ahead-of-time for a program utilizing dynamic features. A static analysis is employed that predicts the likelihood of certain program elements being used during program execution in order to ensure that the native code contains all the needed information to execute the program and support the dynamic features. The analysis engine statically traces the flow of the program from known points in which the program is likely to execute and iteratively traces the data flow of each dependency needed by a reachable instruction in order to determine whether a method, type and field is likely to be used or accessed when the program executes.

Confidence indicators are generated and associated with each method, type, and field based on rules that indicate a degree of certainty that a method, type, and field is likely to be used when the program executes. The confidence indicators are used by a native compiler to determine whether or not to generate native code to support certain dynamic features and to determine which optimizations to perform in order to reduce the execution speed of the program and/or the size of the native code.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
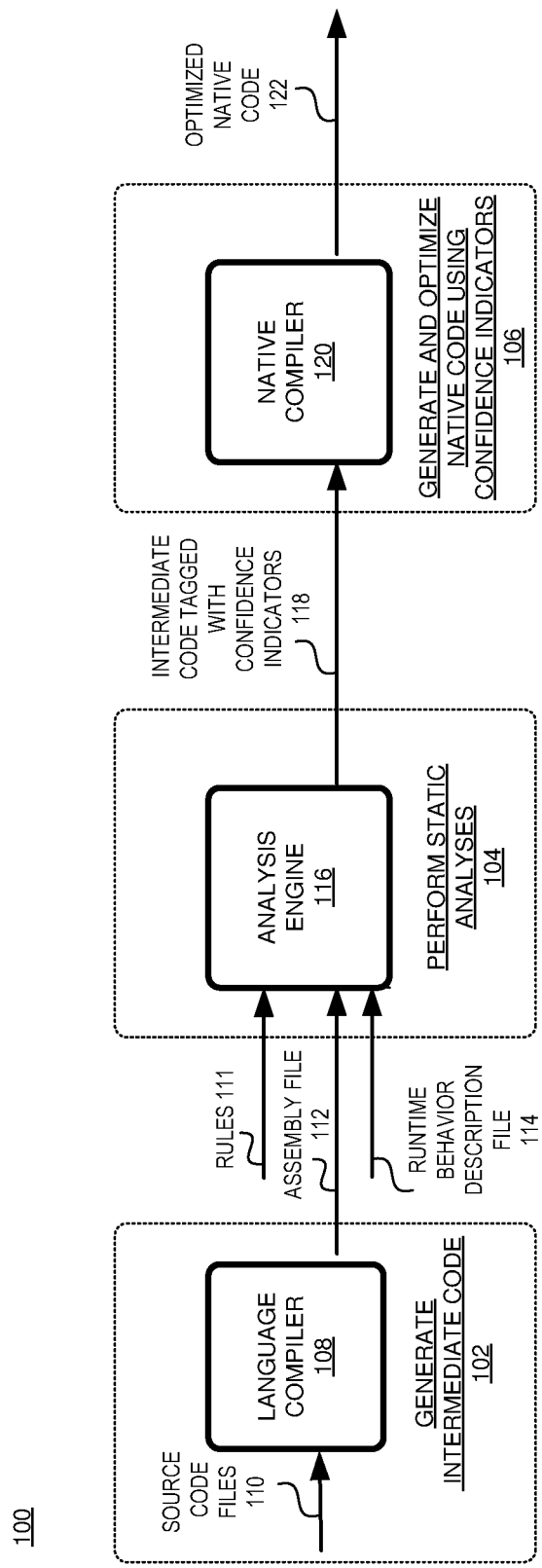
FIG. 1 illustrates an exemplary system for differentiated static analysis of dynamic code optimization.

The subject matter disclosed pertains to an AOT compilation mechanism that statically analyzes a program, having dynamic features, to predict the likelihood that certain elements of the program (e.g., methods, types, and fields) are likely to be used when the program executes. This static analysis is used to generate native code that contains all the instructions and data needed to execute the program. The differentiation between those elements of a program likely and unlikely to be used enables an AOT compiler to perform optimizations ahead-of-time that reduce the size of the native code and/or increase its execution speed.

The predictions are made without executing the program and by performing a static analysis of the program. The static analysis is performed prior to execution of the program and tags certain elements of the program with confidence indicators that classify the elements with either a high level of confidence or a low level of confidence. The static analysis of the program differs from profile data which is generated through multiple runs of an instrumented version of the program using different sets of input data.

A high confidence level indicates a higher likelihood that an element is more likely to be used during execution of the program and low confidence level indicates a lower likelihood that an element is less likely to be used when the program executes. The high and low confidence indicators are used by a compiler to determine for which functions native code is to be generated and how to optimize the program for execution speed and/or to reduce the size of the machine code. The native compiler generates code for those methods more likely to be executed rather than relying on the runtime engine to generate the native code at runtime. The native compiler uses the confidence indicators to determine whether it is practical to generate the native code ahead-of-time or not. The native code increases the execution speed of the program.

The confidence indicators are also used in code optimization. Inlining is an optimization technique that would be practical for those methods that are called frequently. Methods that are marked as high confidence are potential candidates for inlining. Inlining increases the execution speed of the program since it eliminates the overhead to implement the call and to return from the call.

In addition, the code and data layout of the native code can be optimized for execution speed. The confidence indicators can be used by a native compiler to generate a code layout that places hot blocks of different methods close to each other and cold blocks close to each other. The hot blocks can be loaded into an instruction cache earlier thereby increasing the execution speed of the program whereas the cold blocks are tagged for lazy loading. Additionally, the confidence indicators can be used to optimize the layout of the data by identifying data that is used more frequently than others which improves spatial locality and reduces memory latency.

The static analysis of the program is complicated by features of a programming language which are performed during runtime and which rely on the current state of the program. Once such dynamic feature is reflection. Reflection is the ability of a program to examine and modify the structure and behavior of the program at runtime. Reflection enables a program to obtain information about the types defined within loaded assemblies and the types defined within them, such as classes, interface, and value types. Reflection is implemented by the runtime environment and relies on the metadata generated by a language compiler and other information needed by the runtime environment.

In order to limit the size of the native code, only those methods that are likely to be executed have AOT native code generated. Otherwise, the size of the generated native code would be impractical. Additionally, optimizations are performed on those methods that are more likely to be executed in order to increase the size of the native code and its execution speed.

The static analysis disclosed herein does not execute the program rather analyzes the program statically, before the program executes. This analysis uses the metadata and the runtime behavior description to determine the execution behavior of the program. The static analysis traces the control flow of the program to reach the instructions more likely to be executed and analyzes all the dependencies that each reachable instruction needs to execute. The static analysis focuses on types, methods, and fields.

The metadata and runtime behavior description file provides data on the roots of the program to facilitate the trace of the program's flow statically. Inter-procedural and intra-procedural data flow analysis is used to find the dependencies needed by each instruction reachable from a root and the dependencies that rely on a dependency. Rules or heuristics are used to classify each type, method and field with an appropriate confidence indicator. The rules are based on well-known patterns of how instructions are executed. The confidence indicators are then used to guide a native AOT compiler in the generation of native code and in performing code optimizations.

Attention now turns to a discussion of the methods, systems, and devices that implement this technique in various aspects.

Differentiated Static Analysis

The differentiated static analysis is described with respect to the .NET framework and an object-oriented programming language. It should be noted that the subject matter disclosed is not limited to any particular runtime environment, operating system, programming language, or programming infrastructure and that these same concepts can be applied to other frameworks (e.g., GUI framework, Java framework, etc), programming environments, programming languages, and operating systems.

The .NET framework is a set of resources designed for the development of applications and web services that operate on Windows® platforms or operating systems. It is designed to provide language interoperability across different programming languages. The .NET framework relies on a Common Language Infrastructure (CLI) which is a specification that enables programs written in different programming languages to execute on any operating system using a Common Language Runtime (CLR). The CLR manages the execution of .NET programs and provides runtime services, such as just-in-time compilation, garbage collection, memory management, exception handling, and so forth.

The CLI specifies a Common Type System (CTS) which is a common set of types and operations that the CLR supports. The CTS defines how types are declared and managed by the CLR. All types are either value types or reference types. A value type is a data type that represents the object's real value. A reference type is a data type whose objects are represented by a reference to the object's real value. The CTS supports the following types: classes; structures; enumerations; interfaces; and delegates. A class defines the data and behavior of a type. A group of types is a namespace or an assembly. The members of a type or type members include methods, fields, properties, and events.

Reflection in the .NET framework enables a program to obtain information about types defined within the loaded assemblies. An assembly contains modules, modules contain types, and types contain members. With reflection a program can determine the types contained in other assemblies, create an instance of a type, bind a type to an existing object, invoke a type's methods or access a type's fields and properties. For example, reflection also enables, at least, the following: (1) creation of type instances at runtime that can be invoked and accessed; (2) location of a type from a loaded assembly and creation of an instance of the type; (3) discovery of information of a method (i.e., name, return type, parameters, access modifiers), implementation details of the method and invocation of a specific method at runtime; (4) discovery of the name, parameters, access modifiers and implementation details of a constructor which can then be used to invoke a particular constructor; (5) discovery of the name, access modifiers, implementation details of a field which can then be used to get or set field values; and (6) discovery of a parameter's name, data type, input/output parameter, and position of the parameter is a method signature.

An application or program that adheres to the CLI can utilize a common class library (i.e., .NET class library) that includes application programming interfaces (APIs) that are executed at runtime. In particular, the common class library includes reflection APIs are included in a System.Reflection namespace. The reflection APIs access at runtime the type metadata of an assembly to obtain descriptions of classes, structures, base classes and interfaces, nested types, enumerations, methods and their parameters, properties, indexers, fields, constructors, events, attributes, and namespaces and uses this information to modify the behavior of the program dynamically. For example, Type.GetMethod(parameter) is a reflection API that obtains one of the method of a type specified by the parameter. Likewise, Type.GetType (parameter) is a reflection API that obtains the type of the parameter.

The dynamic features of a program can include reflection, Common Object Model (COM) interoperability, and so forth. Reflection enables an application to call other functions on the fly which enables serialization/deserialization and frameworks. Serialization is the process where the state of an object is transformed into a byte stream which is later transformed back to a copy of the object. UI frameworks refers to the reflection APIs that are used to access the user interface of an application. COM interoperability enables interoperability between C# managed code and unmanaged code. For example, COM interoperability enables a C# function call to an unmanaged function that is implemented in a dynamic link library.

An AOT compiler is configured to perform static compilation to order to generate native code that includes just the code and data needed to execute a program. In one or more aspects, the AOT compiler uses a runtime directive file that contains directives or hints that identify the program elements whose metadata is needed at runtime. The runtime directive file includes directives that pertain to a type, group of types or a type member and may specify one or more degrees and/or policies. A degree indicates an action to be applied to the type, group of types or type member and the policy indicates how to apply the degree to the type, group of types, or type member.

For example, a directive may specify that a type T of the program is a required type, an optional type or a prohibited in the targeted type environment. A directive may specify that a type member M is a required type member, optional or prohibited in the targeted type environment. The directive may specify that degree D is enabled for type T, or that degree D is disabled, and in other cases, a directive may specify that a degree D is enabled for a type member M or disabled for M in a targeted type environment.

A directive may reference one or more of the following degrees: an activation degree which refers to runtime activation of type instances through reflection; a browse degree which enables runtime introspection over types through reflection; a dynamic degree which refers to runtime access through reflection a runtime serialize degree which enables reflection support for reflection-based serialization and/or deserialization; and a static serialize degree which supports statically synthesized serialization in a particular format (e.g. XML or JSON). In some aspects, degree values may be associated with a degree such as Required-All, Required-PublicAndInternal, Required-Public, All, PublicAndInternal, Public, Included, Auto or Excluded.

The directives are used by the AOT compiler to indicate the following for use in the static compilation: (a) whether degree D applies to type T; (b) whether degree D applies to type member M; (c) whether type T is required; and (d) whether type member M is required. If a type T or type member M is not required, then the compiler can reduce space and processing requirements by omitting dynamic support for T or M. To determine what the submitted directives indicate for a given type T or a given type member M, the compiler may find all directives that apply to T or M, applies composition rules to produce a composite directive, and then determines the result from the composite directive.

The policies can be used to control runtime access to program elements and querying for information about program elements. One set of policies can be specified for assemblies, namespaces, and types and another set of polices can be specified for members. For example, a policy for assemblies, namespaces and types can: (a) control the runtime access to constructors to enable an activation of an instance; (b) control querying for information about program elements but restricts runtime access to these program elements; (c) control runtime access to all type members; and (d) control runtime access to constructors, fields, and properties to enable type instances to be serialized and serialized by third-party libraries. Exemplary policies for a type members can: (a) control querying information about a property, field, method or event element but restrict runtime access; (b) control runtime access to members and querying about the types contained therein; and (c) control runtime access to a member to enable type instances to be serialized and deserialized.

In one aspect, the runtime directives file contains a software-parsable description that can be formatted as a XML, JSON, YAML or SDL file. The runtime directives file is a separate file from the program and the directives are not interleaved with the source code or intermediate code of the program.

Attention now turns to a description of the techniques and systems that perform the differentiated static analysis for dynamic code optimization.

FIG. 1 illustrates a block diagram of an exemplary system 100 for generating machine code (i.e., executable code, native code, etc.) using the differentiated confidence indicators. In one aspect of the subject matter disclosed herein, the system 100 executes a first compilation phase to generate intermediate language code 102, a static analysis phase to generate the confidence indicators for the intermediate language code 104, and a second compilation phase that generates and optimizes native code using the confidence indicators 106.

The system 100 utilizes a language compiler 108 that transforms one or more source code files 110 written in a programming language into an assembly file 112. The language compiler 108 translates statements written in a programming language into an intermediate language code based on the grammar associated with the programming language. Exemplary programming languages include, without limitation, Visual Basic, Visual J#, C++, C#, APL, Cobol, Pascal, C, Java, and the like. Intermediate language code is a processor-independent form of a program consisting of binary instructions. An exemplary intermediate language code is the Common Intermediate Language (CIL) which is defined by the Common Language Infrastructure used by the .NET framework, also known as the Microsoft Intermediate Language (MSIL). Other exemplary intermediate language code include Java® bytecodes, Parrot intermediate representation, Technology Independent Machine Interface (TIMI), and the like.

In one aspect of the disclosure, when the language compiler 108 compiles the source code files 110, intermediate language code and metadata are generated. An assembly file 112 or assembly in the .NET framework is composed of a manifest, metadata, and code files or modules. The manifest contains information about the assembly 112, such as its version number, assembly name, locale, security information, and names of the files that make up the assembly. The code files or modules contain the intermediate language code.

The metadata describes every type and member in each module of the assembly. For instance, the metadata can include a description of the assembly and types and attributes found in the program. The description of the assembly includes the identity of the assembly, the types that are exported, other assemblies that the assembly depends on, and security permissions needed to run the assembly. The description of a type includes the name of a type, the visibility of the type, the base class of the type, interfaces implemented, and the type members, such as the methods, fields, properties, events, and nested types.

The analysis engine 116 uses the metadata and intermediate language code of the assembly file 112, the runtime description file 114, and the rules 111 to analyze the intermediate language code. The rules 111 guide the analysis engine 116 to determine a designation of a confidence level to a program element.

The tagged intermediate instructions 118 are then input to a native compiler 120 that compiles the intermediate language code into optimized native or machine code 122. The confidence indicators are used to determine for which methods AOT code is generated, whether or not to perform certain optimizations, and code and data layout configurations for fast execution speed and/or for a reduced size of the native code.

Although the system 100 shown in FIG. 1 has a limited number of elements in a certain configuration, it should be appreciated that the system 100 can include more or less elements in alternate configurations. The embodiments are not limited in this manner. For example, the system 100 may include an Integrated Development Environment (IDE) (e.g., Microsoft's Visual Studio®, NetBeans, Eclipse, SharpDevelop, Lazarus, etc.) which provides a developer with a set of software development tools, such as compilers, source code editors, profilers, debuggers, linkers, binders, etc. The analysis engine 116 may be part of the tools provided in an IDE.

Furthermore, the confidence indicators are not limited to two confidence indicators or to the high level and low level confidence indicators described herein. There can be multiple confidence indicators with each confidence indicator representing a particular degree of certainty that a program element will be executed. In addition, there can be a sliding scale that varies in accordance with variation of a standard. Additionally, the analysis engine is not limited to the configuration shown above The analysis engine can be incorporated into a language compiler and/or in a AOT compiler for an intended purpose.

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

The method starts by discovering roots of the program that are highly likely to be executed. A root is a type or member that is needed to execute the program. Instructions reachable from these roots are traced to determine whether or not they are likely to be executed. However, most instructions are dependent on program elements that need to exist in order for the instruction to be executed. These dependent program elements are deemed dependencies. In order to determine whether an instruction is likely or not to be executed requires knowing if all the program elements that the instruction depends on are likely to be used or executed as well.

There can be a nesting of dependencies where one dependency relies on other dependencies which in turn rely on additional dependencies and so on. This requires tracing the original dependency in a recursive or iterative manner to find all of the related dependencies that flow from it. This recursive tracing is performed by placing each found dependency in a respective queue so that the found dependency can be traced for any additional dependencies that depend from it. When it is determined that a dependency no longer has any further dependencies, a set of rules is applied to determine whether the dependency has a high confidence or low confidence of being executed. The dependency is then stored in a table with its classification (i.e., high confidence/ low confidence).

Dependencies and their classifications are tracked in a table in order to eliminate duplicate processing. In some instances, instructions in a program may depend on the same dependency, such as in the case of multiple instructions calling the same method. The method is a dependency and once it is classified as high confidence or low confidence initially, it is placed in the table. In this manner, when the dependency is encountered again, the process does not need to determine its classification and instead the process searches the table for its classification.

Dependencies can be found using one or more different approaches. The metadata contains dependencies on methods, types, and fields. For example, the metadata discloses what methods are used in another method, the types of parameters used in a method call, and so on. Since these dependencies are known from the previous compilation by the language compiler, they are listed in the metadata and referred to herein as static dependencies. In some instances, a dependency in the metadata can refer to other types, fields, or methods in the metadata that have dependencies, and these dependencies can refer to metadata having additional dependencies, and so on. The process searches the metadata to find all of these dependencies.

In some cases, not all dependencies can be determined from the metadata. For this reason, a dependency is traced using data flow analyzes (e.g., inter-procedural, intra-procedural) to search for all the uses of the dependency and through this tracing additional dependencies may be discovered. Inter-procedural flow analysis is data flow analysis with intervening function or method calls. Intra-procedural flow analysis is data flow analysis within a function or method. The dependencies that are not found through the metadata but from a data flow analysis are referred to as dynamic dependencies. A dependency is traced to either its use in a well-known function or to a sink. A sink is a function or instruction sequence that has a known behavior. Examples of well-known functions can be any one of the reflection APIs or other method calls that are provided by the runtime environment.

Rules are used to determine which processing queue (i.e., low confidence queue, high confidence queue) to place a dependency and later, which classification to associate with a dependency once all of its associated dependencies are discovered. A high confidence queue contains those dependencies that are likely to be used and the low confidence queue contains those dependencies that are less likely to be used. In one aspect, the technique processes the dependencies from the high confidence queue ahead of the dependencies on the low confidence queue in order to err on the side of not leaving out needed instructions. The technique considers dependencies in both queues in order to ensure that all dependencies are considered in the event the high confidence rules does not discover all the needed dependencies.

The high confidence rules are used to determine whether a method, type or field is classified as high confidence and a low confidence rule is used to determine whether a method, type or field is classified as low confidence. Exemplary high confidence rules include one or more of the following: (1) a method that calls a method that has already been classified as high confidence is labeled as high confidence; (2) a method that has a parent method (i.e. base class) that has been labeled high confidence and which was classified high confidence using a high confidence rule; (3) a method that directly references a high confidence type or field; (4) dependencies of a method that has already been classified as high confidence and which can be traced back to a sink or well-known function (e.g., reflection API); and (5) method calls reachable from a high confidence root.

Low confidence rules include the following: treat every type and member that is not part of the .NET framework, that is, not part of the .NET runtime environment or type environment as being low confidence. For example, the runtime directives file contains a default directive, <Assembly Name="*Application*" Dynamic="Required All"/>, that states that every type and member that is not part of the platform's runtime and type environment should be considered a root. In some instances, these types and members may not execute and for this reason, those types and members are classified as low confidence.

Figure 2:
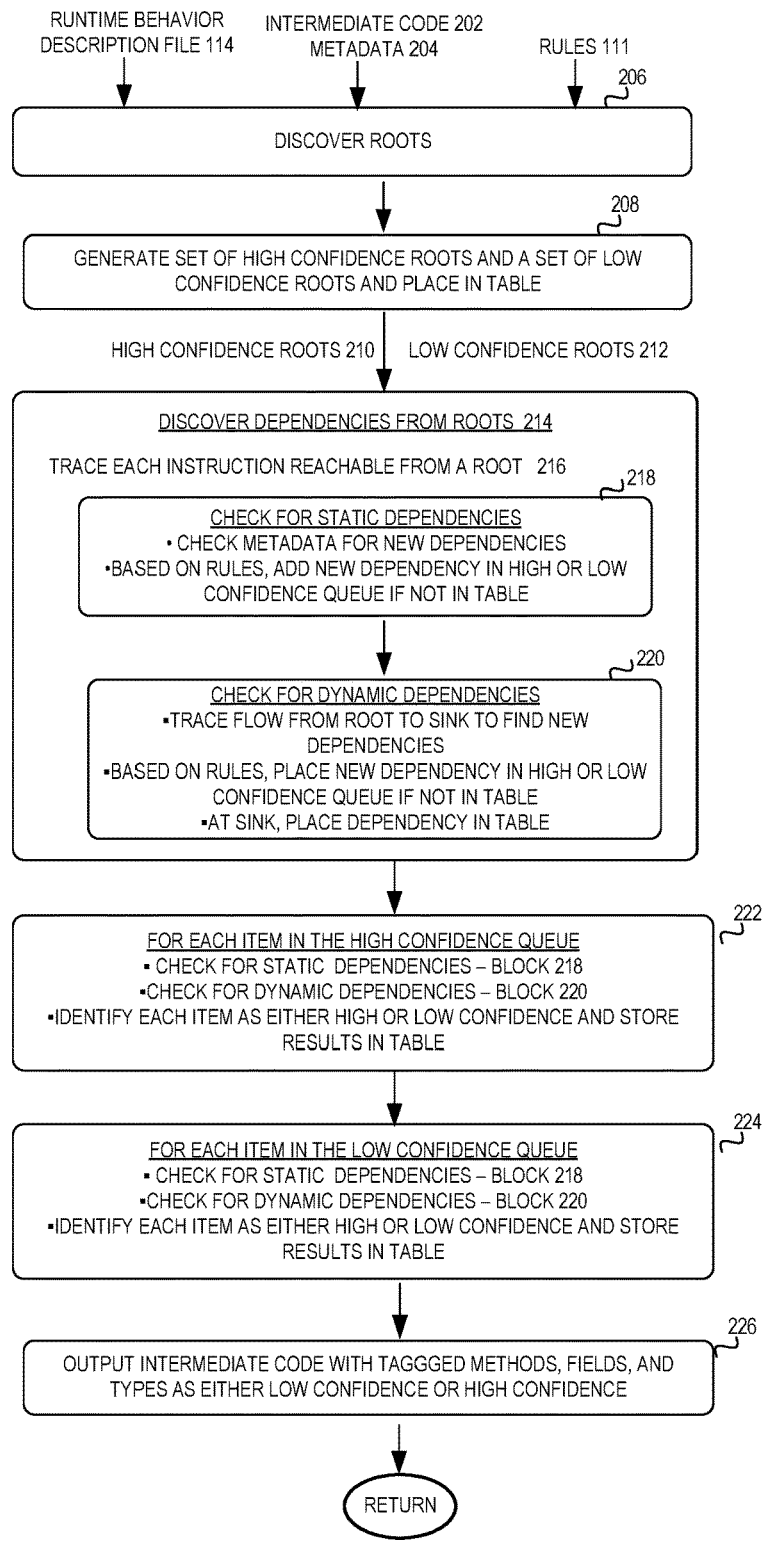
FIG. 2 is a flow diagram illustrating an exemplary method for analyzing the intermediate language code of a program in order to associate the intermediate language code with confidence indicators.

FIG. 2 illustrates a flow diagram of an exemplary method 200 for statically analyzing the intermediate code to generate the confidence indicators. Turning to FIGS. 1 and 2, the analysis engine 116 receives the intermediate language code 202 and metadata 204, the runtime behavior description 114, and a set of rules 206.

The analysis engine 116 starts by discovering the roots of the program (block 206). The roots of the program indicate the origins of the program from which all paths in the program flow. These paths include control flow paths and data flow paths. The roots are classified into two sets: high confidence roots 210; and low confidence roots 212. The high confidence roots 210 include those program elements that are more likely to be necessary when the program executes and the low confidence roots 212 reflect those program elements that are less likely to be necessary when the program executes.

In one aspect, the high confidence roots 210 include the initial entry point of the program (i.e., main( ), the System.Object class, the types of the type environment supported by the runtime environment, and certain program elements specified in the runtime directives file that are denoted as required. The System.Object class is the base class of all other classes and as such, its methods are necessary for all other classes to operate. Likewise, the types supported by the runtime environment are necessary for the program's execution which may be contained in various namespaces.

The runtime behavior description file 114 contains directives that indicate whether a specific type or type member is required for the program's execution. These specific program elements are deemed high confidence roots. For example, the directive <Type Name="SomeType" Dynamic="Required All" I> indicates that the type SomeType and all of its members are roots due to the use of the designation "Required All." The directive <Assembly Name="*Application*" Dynamic="Required All"/> indicates that every type and type member that is not part of the .NET framework or the Windows® runtime environment is required. However, since this directive is the default directive, it is likely that those types and type members that are not part of the .NET framework or Windows® runtime environment are less likely to run and as such, they are considered low confidence roots.

The analysis engine 116 reads the metadata 204 and runtime behavior description 114 to generate the set of high confidence roots 210 and the set of low confidence roots 212 (block 208). The metadata 204 contains the initial entry point of the program, the methods contained in the System.Object namespace and the types of the type environment. The runtime behavior description 114 includes directives that denote additional high confidence roots 210 and low confidence roots 212.

The analysis engine 116 traces each root in the set of high confidence roots 210 to each instruction reachable from a root. For each instruction, the analysis engine 116 discovers dependencies that need to be present in order for the instruction to execute (block 214). The analysis engine 116 checks for both static dependencies (block 216) and dynamic dependencies (block 218). A static dependency is a dependency that was discovered at compilation time by the language compiler and a dynamic dependency is one that is discovered through the iterative tracing using control and/or data flow techniques. To find static dependencies, the analysis engine 116 checks the metadata 204 for dependencies associated with any types, methods or fields used in the instruction (block 218). If the dependency is already in the table, the analysis engine 116 does not need to classify the dependency (block 218). If the dependency is not in the table, the dependency is placed in either the high confidence queue or the low confidence queue based on the application of the rules (block 218).

Next, the analysis engine 116 checks for dynamic dependencies that are needed in order for the instruction to run (block 220). A dependency is traced to a sink or well-known function (block 220). New dependencies encountered during the trace are placed in either the high confidence or low confidence queue based on application of the rules if they are not already found in the table (block 220). When the trace reaches a sink or well-known function, the dependency is placed in the table along with an associated classification that is based on application of the rules (block 220). These steps, 216-220, are repeated for each instruction that is reachable from a high confidence and low confidence root.

Next, each item in the queues is processed to discover additional static and dynamic dependencies that were not found from tracing the reachable instructions from the roots. Each item in the high confidence queue is processed first to discover additional static dependencies, and then traced to find additional dynamic dependencies. The discovery of the static dependencies is performed as shown in block 218 and the discovery of the dynamic dependencies is performed as shown in block 220. After these additional searches, the rules are applied to the item to classify the item as either high or low confidence. The item and its classification is then stored in the table. This process is repeated until there are no more items in the high confidence queue (block 224).

Then, the items in the low confidence queue are processed (block 226). Each item in the low confidence queue is checked for additional static dependencies and additional dynamic dependencies. The discovery of the static dependencies is performed as shown in block 218 and the discovery of the dynamic dependencies is performed as shown in block 220. After these additional searches are completed, the item is classified as either high or low confidence based on application of the rules and the item and its classification are stored in the table (block 224).

When both confidence queues have been processed, then the intermediate code is output with the confidence indicators (block 226). In one aspect, the intermediate language code is annotated with the confidence indicators. In other aspects, the intermediate language code and the confidence tags are in separate files or in separate sections of the same file. It should be noted that the aspects disclosed herein are not limited to a particular configuration.

Figure 3:
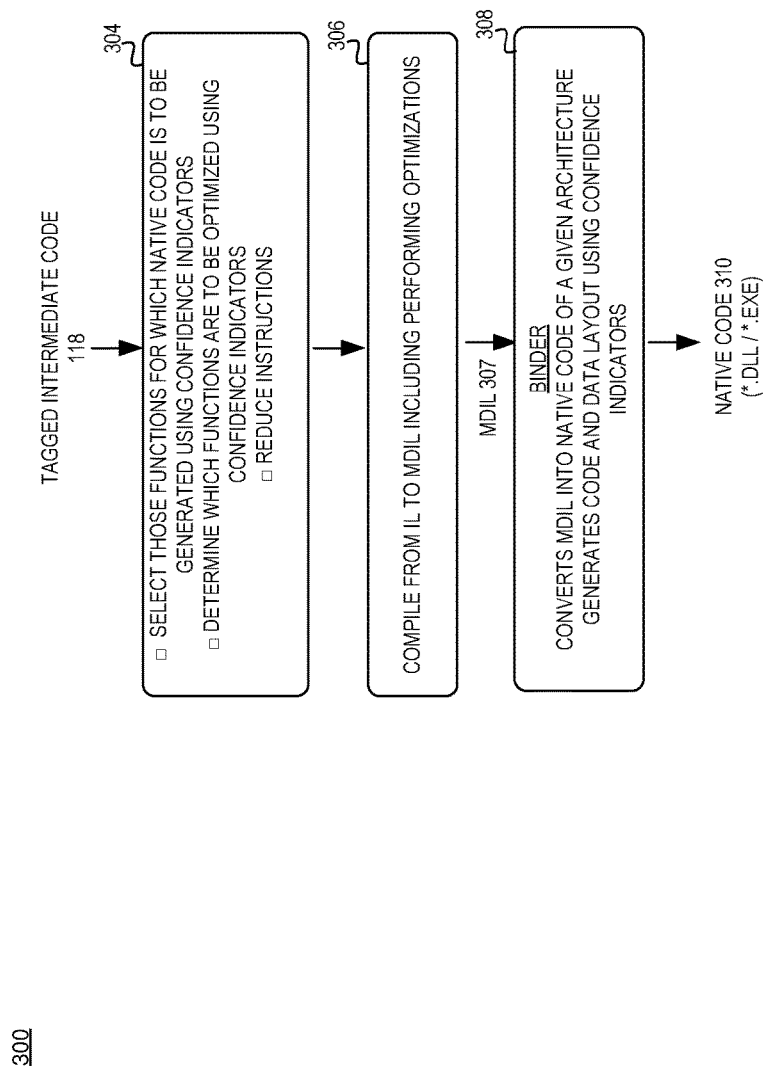
FIG. 3 is a flow diagram illustrating an exemplary method for utilizing the confidence indicators to generate native code.

FIG. 3 illustrates a flow diagram of an exemplary method 300 for utilizing the confidence indicators in the generation of native code. Referring to FIGS. 1 and 3, the native compiler 120 receives the tagged intermediate language code 118 and initiates various processes to transform the program into optimized native code. Initially, the native compiler 120 determines for which functions native code is to be generated based on the confidence indicators (block 304). For example, the native compiler 120 can determine whether native code should be generated for instantiations of generic types or allow the runtime environment to generate code for the instantiations of the generic types (block 304). For high-confidence instantiations, the native code is preferred since it increases the execution speed (block 304). For low-confidence instantiations, the runtime environment will generate the code when needed (block 304).

In addition, the native compiler determines which optimizations to perform on a method based on the confidence indicators (block 304). For instance, the methods tagged as high confidence are analyzed for inlining. Inlining is a code optimization where the body of a method is replaced in place of a call to the method Inlining eliminates the overhead for making the call (i.e., pushing variables onto the stack when the call is made) and the overhead for returning back to the method (i.e., popping the variables off the stack). Additionally, the native compiler eliminates unnecessary code that is not tagged as either low confidence or high confidence (block 304). The reduction of the untagged code reduces the size of the application.

The intermediate language code (i.e., MSIL, CIL) is then compiled into a machine dependent intermediate language (MDIL) 307 (block 306). MDIL is based on the target architecture's assembly language. During this compilation phase, any of the well-known code optimizations are performed such as without limitation, branch elimination, loop collapsing, instruction combining, constant folding, constant propagation, dead code elimination, integer divide optimization, expression simplification, loop fusion, inlining, invariant expression elimination, strength reduction, loop unrolling, and so forth (block 306).

Next, a binder converts the MDIL 307 into native code for a target architecture (block 308). The binder also determines the code and data layouts for the machine instructions using the confidence indicators associated with the tagged program elements (block 308). The binder can generate a code layout that optimizes the use of the instruction cache of a target architecture in order to decrease access latency of the instruction cache. The binder can map instructions from a basic block of a control flow graph to a virtual address space that separates hot blocks from cold blocks. A hot block is a portion of code that is used frequently and a cold block is a portion of code that is used less frequently. The confidence indicators can be used to indicate whether a method is deemed a hot block or a cold block. Those methods tagged as high confidence are considered as a hot block and these methods tagged as low confidence are considered a cold block. The binder can generate a code layout that places hot blocks of different methods close to each other and cold blocks close to each other. In this manner, the hot blocks can be loaded into the instruction cache thereby increasing the execution speed of the program. The cold blocks can be tagged for lazy loading. Lazy loading is where a method or object is not loaded until the point at which it is used.

Furthermore, the confidence indicators can be used by the binder to optimize the layout of the data in order to improve spatial locality and to reduce memory latency (block 308). The confidence indicators can be used to differentiate hot data and cold data. Hot data is data that is used frequency, such as types and fields that are marked as high confidence and cold data is data that is used less frequency, such as types and fields that are marked as low confidence.

At the completion of the binder's processing, native or machine code 310 is output (e.g., *.dll or *.exe) (block 308).

It should be noted that the description of the native compiler and the steps used in the native compilation is exemplary and that the subject matter is not limited to the configuration and processes of the native compiler described above. For example, the native compilation may utilize profile data in the optimization phase as an additional source of information for the code optimization. The role of the binder may be replaced by a code generator of the native compiler.

Technical Effect

Aspects of the subject matter disclosed herein pertain to the technical problem of generating native code for a program written in a programming language having dynamic features or behavior. A dynamic feature of a programming language is a feature that alters the behavior of the program at runtime. In order to generate the native code ahead-of-time, a static analysis is employed that predicts the likelihood of certain program elements being used in the execution of a program in order to ensure that the native code contains all the needed information to execute the program, especially to support the dynamic features.

The technical features associated with addressing this problem involve an analysis engine that generates confidence indicators, and a native compiler that uses the confidence indicators to generate and optimize native code. The analysis engine statically traces the flow of the program from known points in which the program is likely to execute and to iteratively trace the data flow of each dependency needed by a reachable instruction in order to determine whether a method, type and field is likely to be used or accessed when the program executes. The confidence indicators are used to identify a degree of certainty to which a method, type, and field is likely to be used when the program executes. The confidence indicators are used by a native compiler to determine whether or not to generate native code for certain methods and types and which optimizations to perform to reduce the execution speed of the program and the size of the native code.

Exemplary Operating Environments

Figure 4:
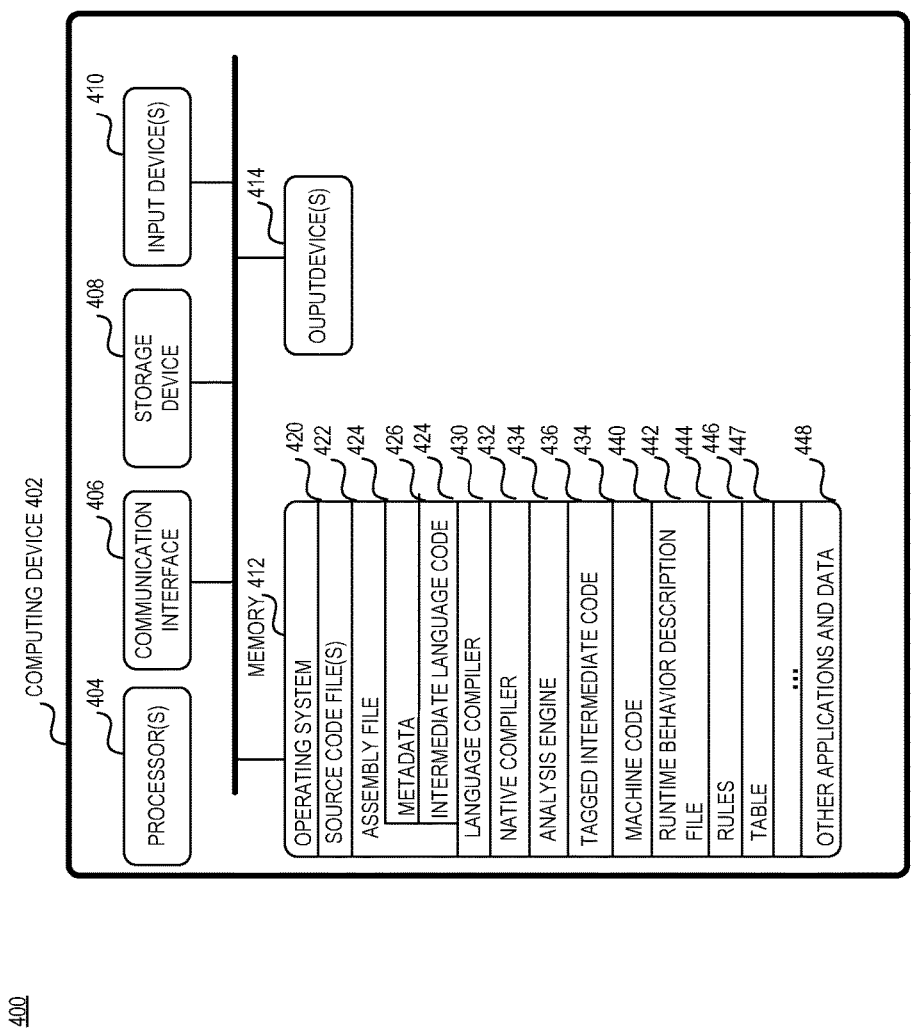
FIG. 4 is a block diagram illustrating a first operating environment.

Attention now turns to a discussion of an exemplary operating environments. Turning to FIG. 4, the aspects may be applied to a first operating environment 400 utilizing at least one computing device 402. The computing device 402 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 400 may be configured in a network environment, a distributed environment, a multi-processor environment, or a stand-alone computing device having access to remote or local storage devices.

The computing device 402 may include one or more processors 404, a communication interface 406, one or more storage devices 408, one or more input devices 410, one or more output devices 412, and a memory 414. A processor 404 may be any commercially available or customized processor and may include dual microprocessors and multi-processor architectures. The communication interface 406 facilitates wired or wireless communications between the computing device 402 and other devices. A storage device 408 may be computer-readable medium that does not contain propagating signals, such as modulated data signals transmitted through a carrier wave. Examples of a storage device 408 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 408 in the computing device 402. The input devices 410 may include a keyboard, mouse, pen, voice input device, touch input device, etc., and any combination thereof. The output devices 414 may include a display, speakers, printers, etc., and any combination thereof.

The memory 412 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 412 may also include one or more external storage devices or remotely located storage devices that do not pertain to propagated signals, such as modulated data signals transmitted through a carrier wave.

The memory 412 may contain instructions, components, and data. A component is a software program that performs a specific function and is otherwise known as a module, program, and/or application. The memory 412 may include an operating system 420, one or more source code files 422, an assembly file 424 including metadata 426 and intermediate code 428, a language compiler 430, a native compiler 432, an analysis engine 434, tagged intermediate code 436, machine code 440, a runtime behavior description file 442, a rules file 444, and other applications and data 446.

Figure 5:
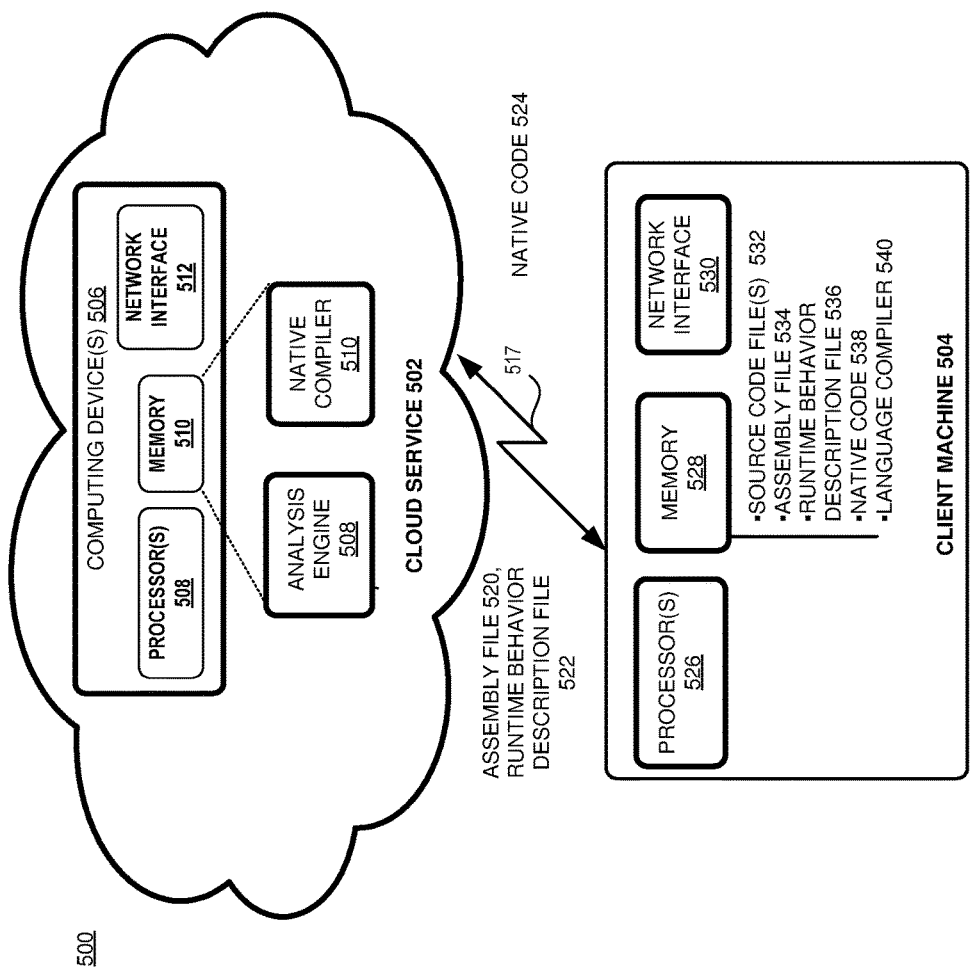
FIG. 5 is a block diagram illustrating a second operating environment.

Turning to FIG. 5, the aspects may be applied to a second operating environment 500 including a cloud service 502 that provides the delivery of an on-demand compilation service for users interacting with the cloud service 502 from a client machine 504. In this operating environment, the cloud service 502 may be embodied as a data center having a group of physical computing machines that communicate via a network to one or more client machines. Alternatively, the cloud service may be configured as a pool of hardware (e.g., computing resources, network resources, storage resources) and software resources configured to provision, create and manage virtual machines and their operating systems to provide the on-demand compilation services. The cloud service 502 may one or more computing devices 506, each including one or more processors 508, a memory 510, and a network interface 512. The memory 510 may store an analysis engine 514 and a native compiler 516 as described above.

The compilation services provided by the cloud service 502 may be, without limitation, to analyze any program for AOT compilation, including those written in any programming language supporting dynamic features. In one aspect of the cloud service 502, a client machine 504 may submit an assembly file 520 and a runtime behavior description file 522 to the cloud service 502 and in response to receiving these files the cloud service 502 generates native code 524 that is transmitted back to the client machine 504. Alternatively, the cloud service 502 may include a language compiler (not shown) that compiles source code files into an intermediate language code that is input to the analysis engine. The cloud service 502 may include a source code repository (not shown) to store source code files, an integrated development environment to develop the source code files, and other tools needed to perform the compilation services.

The cloud service 502 interacts through a network 517 with one or more client machines 504, whose users request the compilation services of the cloud service 502. The network 517 may be any type of communication medium such as without limitation, local area networks, wide area networks and can utilize any type of communication protocol (i.e., wired or wireless). The computing devices 506 of the cloud service 502 and the client machine 504 may consist of a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof.

The client machine 504 may include at least one processor 526, a memory 528, and a network interface 530 enabling communications between the cloud service 502 and the client machine 504 as described above. In one aspect, the memory 528 of the client machine 504 may store one or more source code files 532, an assembly file 534, a runtime behavior file 536, native code 538, and one or more language compilers 540.

In accordance with aspects of the subject matter described herein, a computer system can include one or more processors and a memory connected to the one or more processors. The system includes a first component and a second component. The first component performs a static analysis of a program having at least one dynamic feature to associate at least one of a plurality of confidence indicators to at least one program element in the program. The plurality of confidence indicators include a high confidence indicator and a low confidence indicator. The high confidence indicator designates a program element as having a high confidence of being used when the program executes and the low confidence indicator designates a program element as having a low confidence of being used when the program executes. The second component generates native code based on the confidence indicators.

The program elements include at least one of a type, method or field of an object-oriented programming language. In some aspects, the second component generates native code for an instantiation of a generic type when the generic type is associated with a high confidence indicator and inlines a method designated with a high confidence indicator. In other aspects, the second component generates a code layout that includes hot code and cold code, where the hot code includes one or more methods associated with a high confidence indicator and the cold code includes one or more methods associated with a low confidence indicator. The system can include a language compiler that generates intermediate language code of the program. The first component performs the static analysis using the intermediate language code. A dynamic feature includes one or more of reflection, late binding, and instantiation of generic types.

A device can include at least one processor and a memory connected to the at least one processor. The at least one processor is configure to perform a static analysis of a program having at least one dynamic feature, such as, without limitation, reflection. The at least one processor associates each type, method and field in a program with at least one of a plurality of confidence indicators. The plurality of confidence indicators include a high confidence indicator and a low confidence indicator, where a high confidence indicator indicates that a type, method or field has a high confidence of being used when the program executes and where a low confidence indicator indicates that a type, method and field has a low confidence of being used when the program executes. The static analysis of the program traces each instruction reachable from a root to discover each dependent type, method, or field needed by an instruction reachable from a root to execute and to discover uses in the program of each dependent type, method and field. The at least one processor associates a respective one of the plurality of confidence indicators to each method, type and field discovered in the trace and generates optimized native code for the program based on the associated confidence indicators.

The static analysis is performed on an intermediate language code representation of the program. A root includes at least one entry point into the program, types supported by a type environment associated with the program, and/or runtime directives that indicate types and type members needed for execution of the program. The static analysis uses inter-procedural and/or intra-procedural data flow analysis to discover uses of a dependent method, type and field.

A method of using a system and device, such as the system and device described above, can include operations such as statically tracing a flow of execution of a program having at least one dynamic feature to determine which types and type members are used in the program. The static trace discovers each dependency needed by an instruction reachable from a root to execute and discovers uses in the program of each dependency. In addition, the method classifies each type and type members encountered during the static trace with one of a plurality of confidence indicators. In one or more aspects, the plurality of confidence indictors include a high confidence indicator and a low confidence indicator, where the high confidence indicator indicates a high confidence that a type and/or type member is used when the program executes and the low confidence indicator indicates a low confidence that a type and/or type member is used when the program executes. The method optimizes the native code for the program based on the confidence indicators associated with a type and/or type member of the program.

The type and type members include methods and fields. The root of the program includes at least one of entry points of the program, types supported by a runtime associated with the program, and runtime directives that indicate necessary program elements of the program. The method classifies each type and type member encountered during the trace with one of a plurality of confidence indicators by tracing each dependency to a sink and applies one or more rules to determine which confidence indicator to associate with a dependency. A sink is a defined method or a sequence of actions with a known behavior. The method optimizes the native code by generating native code for those methods associated with a high confidence indicator. The method includes compiling the program into intermediate language code and generating metadata for the program that includes one or more dependencies for each type and type member known during the compilation. The static trace discovers a dependency from the metadata associated with a type and type member. The static analysis uses inter-procedural and/or intra-procedural data flow analysis to discover a use of a dependency.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:
   at least one processor and a memory;
   a first component, that when executed by the at least one processor, performs a static analysis of a program having at least one dynamic feature and tags at least one program element in an intermediate code representation of the program with at least one of a plurality of confidence indicators, the plurality of confidence indictors including a high confidence indicator and a low confidence indicator, the high confidence indicator designating a program element as having a high confidence of being used when the program executes and the low confidence indicator designating a program element as having a low confidence of being used when the program executes, wherein the static analysis is performed, without representative user inputs, to determine the at least one of the plurality of confidence indicators; and
   a native compiler, that when executed by the at least one processor, generates native code for the at least one program element when the at least one program element is a method tagged with a high confidence indicator.

2. The system of claim 1, wherein the native compiler performs optimizations on the program based on a type and/or field associated with a high confidence indicator.

3. The system of claim 1, wherein the native compiler generates native code for an instantiation of a generic type when the generic type is associated with high confidence indicator.

4. The system of claim 1, wherein the native compiler inlines at least one method when designated as high confidence.

5. The system of claim 1, wherein the native compiler generates a code layout that includes hot code and cold code, wherein the hot code includes one or more methods associated with a high confidence indicator and the cold code includes one or more methods associated with a low confidence indicator.

6. The system of claim 1, wherein a dynamic feature includes one or more of reflection, late binding, and instantiation of generic types.

7. A method, comprising:
   statically tracing a flow of execution of a program having at least one dynamic feature to determine which types and type members are used in the program;
   classifying one or more types or type members in an intermediate code of the program encountered during the static trace with one of a plurality of confidence indicators, the plurality of confidence indictors including a high confidence indicator and a low confidence indicator, the high confidence indicator indicating a high confidence that a type and/or type member is used when the program executes and the low confidence indicator indicating a low confidence that a type and/or type member is used when the program executes, wherein the static trace is performed without representative user inputs to determine the at least one of the plurality of confidence indicators; and generating native code for a method associated with a type and/or type member having a high confidence indicator.

8. The method of claim 7, wherein the one or more types or type members includes methods and/or fields.

9. The method of claim 7, wherein the static trace of the flow of the execution of a program starts at a root of the program that includes at least one of entry point of the program and utilizes one or more types supported by a runtime associated with the program, and one or more runtime directives that indicate necessary program elements of the program.

10. The method of claim 7, wherein classifying one or more types or type members encountered during the trace with one of a plurality of confidence indicators further comprises:
tracing each dependency to a sink; and
applying one or more rules to determine a confidence indicator to associate with a dependency.

11. The method of claim 7, further comprising:
optimizing the native code based on the high confidence indicators and low confidence indicators associated with methods, fields and types of the program.

12. The method of claim 7, further comprising:
producing metadata of the program from a compilation of the program, the metadata of the program including one or more dependencies for each type and type member of the program known during the compilation,
wherein the static trace discovers a dependency from the metadata associated with a type and/or type member.

13. The method of claim 7, wherein the static trace uses inter-procedural data flow analysis and/or intra-procedural data flow analysis to discover uses of a dependency.

14. The method of claim 7, wherein the dynamic feature includes at least one of creating type instances at runtime that can be invoked and accessed, locating a type from an assembly and creating of an instance of a type, and invocation of a method at runtime.

15. A device comprising:
at least one processor and a memory;
wherein the at least one processor is configured to:
perform a static analysis of a program, the program having at least one dynamic feature, the static analysis associates a type, method and/or field in the intermediate code of the program with at least one of a plurality of confidence indicators, the plurality of confidence indictors including a high confidence indicator and a low confidence indicator, the high confidence indicator indicating that a type, method, and/or field has a high confidence of being used when the program executes and the low confidence indicator indicating that a type, method and/or field has a low confidence of being used when the program executes, wherein the static analysis is performed without tracing flow of user input data through the program; and
generate through compilation, native code to instantiate a generic type, the generic type associated with a high confidence indicator.

16. The device of claim 15, wherein the at least one processor is further configured to perform the static analysis of the program by performing actions that:
discover one or more roots of the program;
trace each instruction reachable from a root to check for static and dynamic dependencies of each instruction; and
associate each static and dynamic dependency with a high confidence indicator or a low confidence indicator.

17. The device of claim 15, wherein the at least one processor is further configured to:
optimize at least one method associated with a high confidence indicator.

18. The device of claim 15, wherein the static analysis uses inter-procedural data flow analysis and/or intra-procedural data flow analysis to discover uses of a dependent method, type and/or field without inputs.

19. The device of claim 15, wherein the at least one dynamic feature includes reflection.

* * * * *